No. 673,296. Patented Apr. 30, 1901.
G. SIEMSGLÜSS & G. DASEKING.
APPARATUS FOR MILKING.
(Application filed Feb. 4, 1899.)
(No Model.) 4 Sheets—Sheet 2.
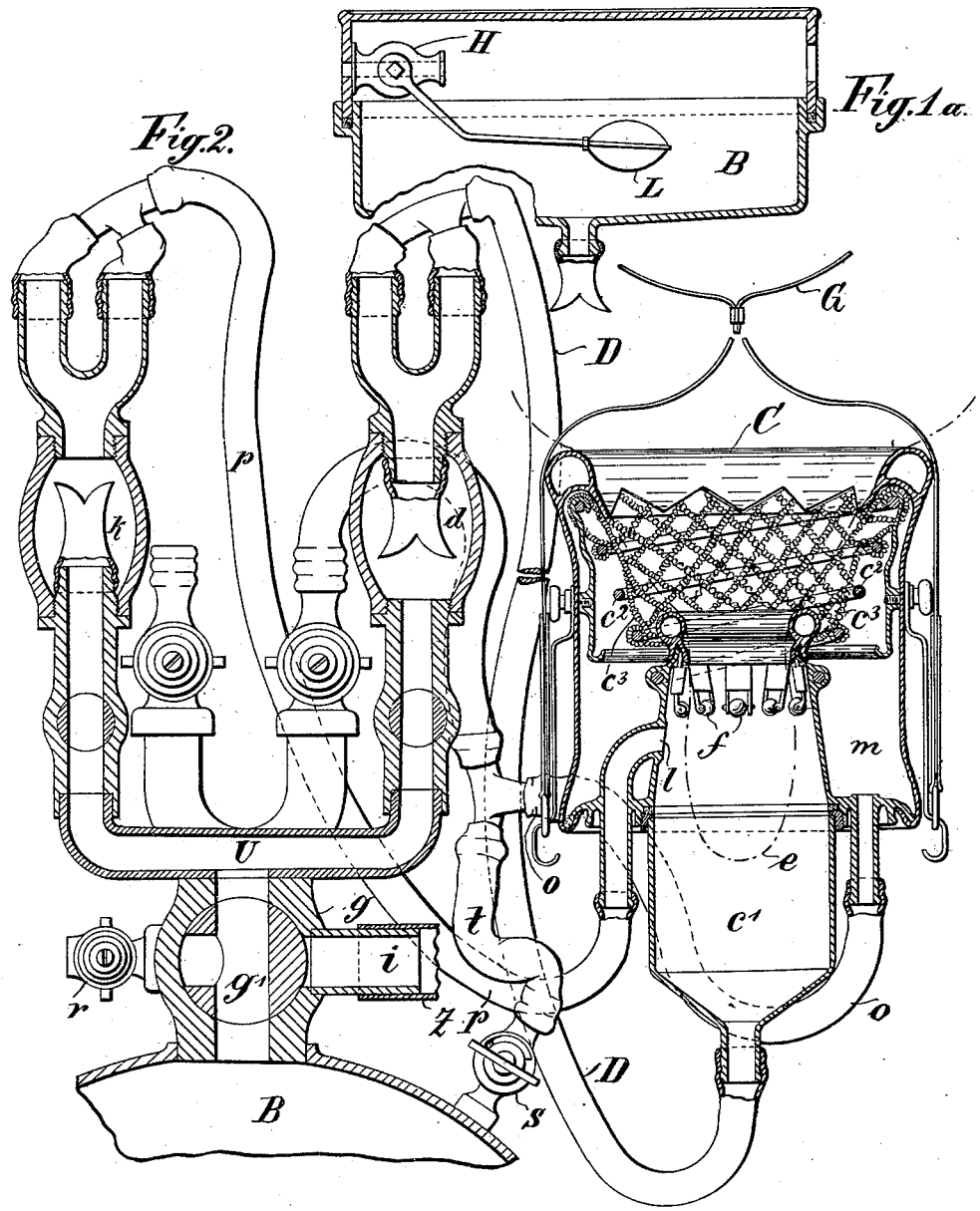

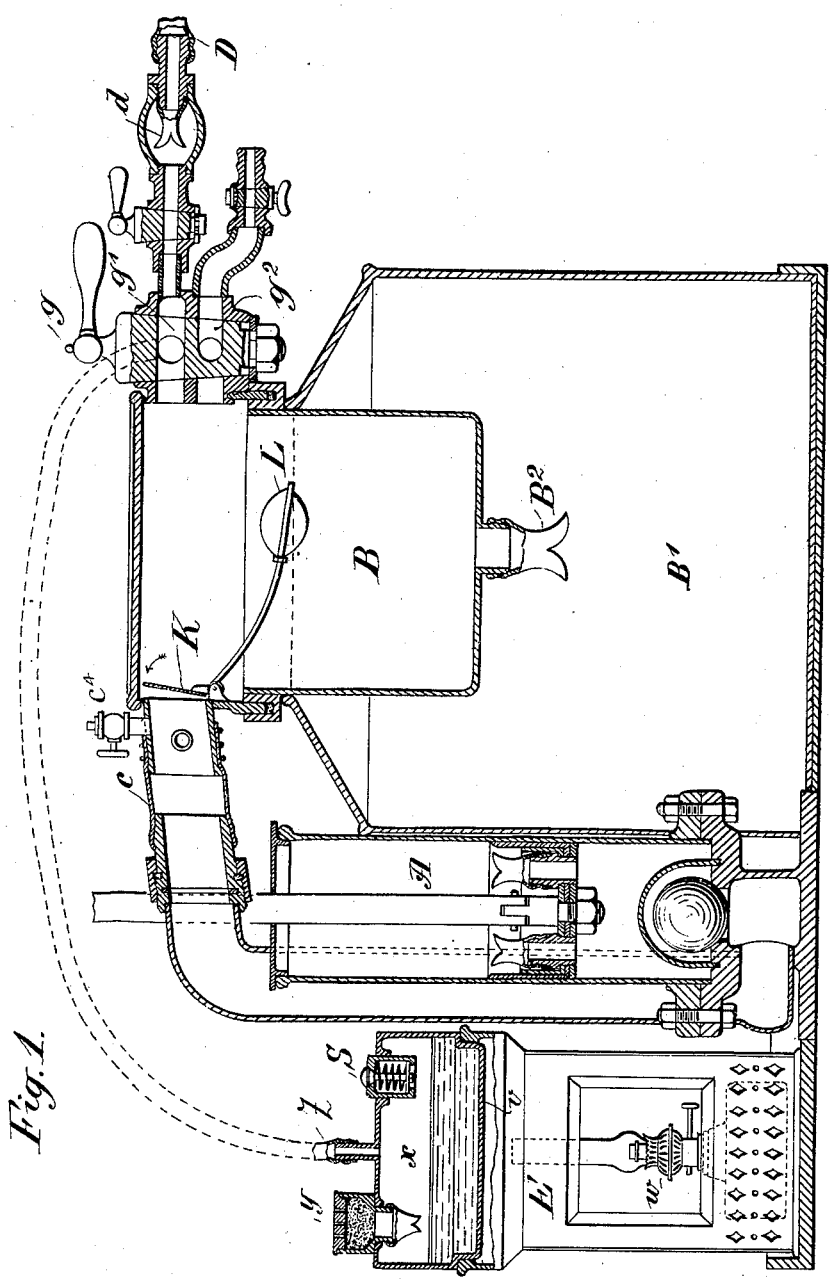

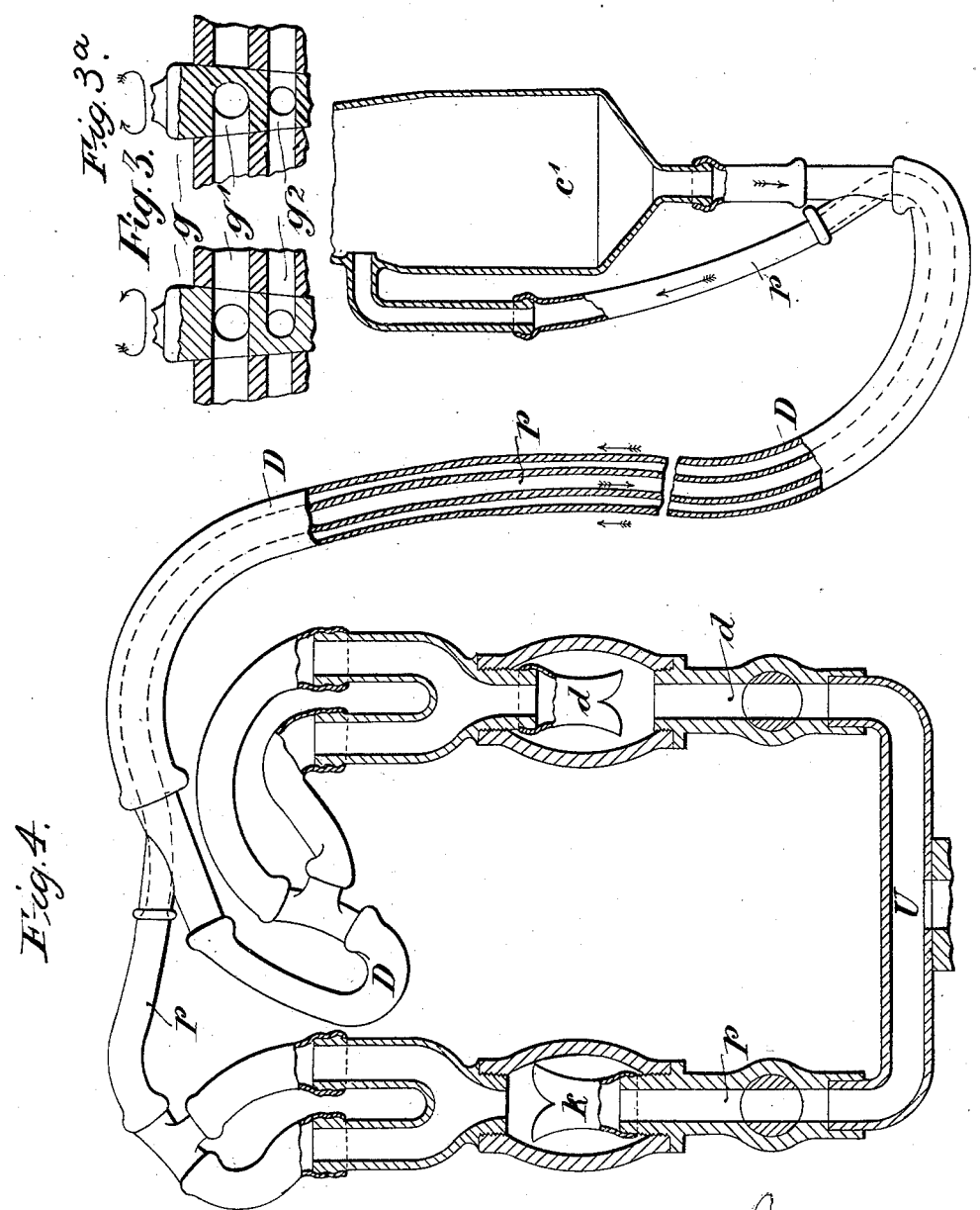

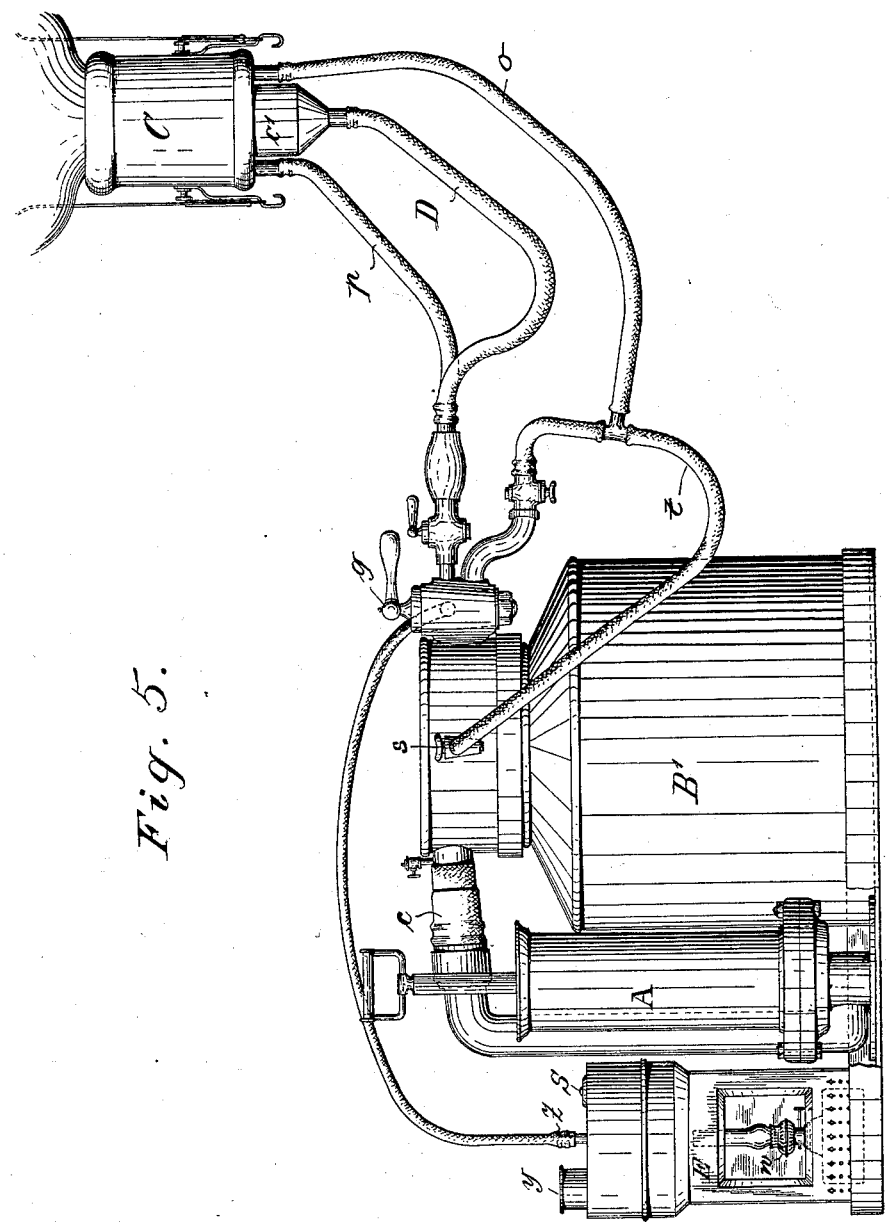

UNITED STATES PATENT OFFICE.

GEORG SIEMSGLÜSS, OF WALSRODE, AND GEORG DASEKING, OF HANOVER, GERMANY.

APPARATUS FOR MILKING.

SPECIFICATION forming part of Letters Patent No. 673,296, dated April 30, 1901.

Application filed February 4, 1899. Serial No. 704,556. (No model.)

*To all whom it may concern:*

Be it known that we, GEORG SIEMSGLÜSS, merchant, of Walsrode, near Hanover, and GEORG DASEKING, manufacturer, of Celler Chaussee 179, Hanover, Germany, have invented an Improved Apparatus for Milking, of which the following is a specification.

It has been observed that milking is more easily carried on if the teats are kept moist and warm. The new milking apparatus takes advantage of this point and effects the moistening of the teat and constantly surrounding it with warm air during the process of milking or inducing the flow of milk. This air is, moreover, previously purified, so that the milk and the teat come in contact with only the purest air, free from bacteria.

The subject of our invention is a vacuum milking apparatus by means of which the above purposes are effected; and our invention will be described with reference to the accompanying drawings, in which—

Figure 1 is a vertical section of the vacuum and milk-receiving apparatus. Fig. 1ª is a vertical section of a milk vessel, illustrating a modification in construction of the automatic air-valve for controlling the suction. Fig. 2 is a vertical section of the milking apparatus. Figs. 3 and 3ª show in vertical section and in two positions a three-way cock employed to control the connection between the primary milk-receiver and the vacuum apparatus and milk-reservoir, as hereinafter described. Fig. 4 is a sectional elevation of connections between the primary milk-receiver and vacuum apparatus and milk vessel, showing a concentric arrangement of the milk-pipe and air-pipe, as hereinafter described. Fig. 5 is an elevation of the entire apparatus in position for use.

The vessel B is suspended in the milk-reservoir B', and the milk flows from it through the valve B" into the milk-reservoir B'. In consequence of this separate vacuum-space— viz., the vessel B—it being only necessary to use a relatively small space in which to produce a vacuum, the suction action can be rapidly strengthened or weakened, and, moreover, a closing of the cocks while the milk-receptacle is being fitted on is rendered unnecessary.

To prevent the liquid from overflowing through the pipe $c$ into the pump when the vessel B becomes too full, a valve-lid K, with a float L, is attached. As soon as the liquid comes into contact with the float L it raises it, and the float forces the lid K against the opening of the pipe $c$. The vacuum then draws the lid so tightly against this opening that it is completely sealed.

The tube or pipe $c$ has a cock $c^4$, and as soon as the liquid is run off this cock is opened, and when the air enters the lid is again drawn back by means of the float.

Instead of a valve-lid with a float a cock with a float may be used, Fig. 1ª. When the liquid has in this case reached the maximum height, the float L is raised and opens the cock H, so that air enters and dispels the vacuum. The liquid runs off, and the float sinking down closes the cock again.

The primary milk-receiver C consists of two chambers $c'$ and $m$ and is connected with the milk vessel B by means of the double three-way cock $g$, so that on turning the cock $g$ the inner chamber $c'$ and the outer chamber $m$ are alternately brought into connection with the vacuum by means of the pipe. In consequence of this the teat $e$ is rubbed and the udder massaged. The valve arrangement $g$ need not necessarily be a three-way cock, but any suitable device may be employed. The way U to the inner chamber $c'$ is divided into two ways, the milkway D and the airway $p$, which are respectively closed by lipped valves $d$ and $k$. The valve $d$ in the milk-tube D opens away from the chamber $c'$, while the valve $k$ in the pipe $p$ opens toward it. When the way U is connected with the outer air, the air flows through the valve $k$ and the pipe $p$ into the upper part of the inner chamber $c'$ at $l$, and consequently some of the milk contained in the cock and the pipe is taken up by it and spurted against the teat. The air thus circulates continually around the inner chamber $c'$. The lipped valve $d$ in the milk-pipe D being turned away from the chamber $c'$ prevents the air from passing through this valve into the milk-tube D. Further, this valve, which prevents the outer air from forcing itself into the chamber $c'$ from below, compels the outer air to take the way through the air-pipe $p$ and to enter at the top into the inner chamber $c'$. As the outer air when streaming rapidly against the teat, especially when the teat is moist, produces a sensation of cold, warm air must be introduced into the chamber $c'$. To enable this to be done, the vessel E is provided, which is connected, by means of the pipe Z, with the port $i$, Fig. 2, which connects the upper port $g'$ of the cock $g$ with the outer air. Under the bottom $v$ of this vessel E a lamp $w$ burns. In the chamber $x$ over the bottom $v$ is water or formalin, which vaporizes and produces expansion in the chamber $x$, as the passage outward at $y$ is closed by a valve. The safety-valve S prevents the expansion in the vessel E from being to great.

The lamp-casing E takes the form of a lantern, so that light is always at hand, and a separate lantern is not necessary.

When the cock $g$ is so placed that the port $i$ is in connection with the inner chamber $c'$, the warm air flows out of the chamber $x$ through the pipe Z, the port $i$, and the air-pipe $p$ into the inner chamber $c'$. Simultaneously outer air flows through the valve $y$ into the vessel E, corresponding in volume with the warm air which flows into the chamber $c'$. The air is purified before it enters into the vessel E, so that after the water and formaldehyde-vapor have effected the destruction of the bacteria in the vessel E only pure air can reach the receptacle $c'$.

In another application, Serial No. 704,557, filed simultaneously with this, we have described and claimed the milking apparatus, including means for applying massage to the udder and teats and the construction of controlling-cock, by means of which the chambers are intermittently connected with the vacuum-chamber.

In the above description of our vacuum milking apparatus it will be understood that it is essential to produce a substantially air-tight closure or joint between the primary milk-receiving device C and the udder. To this end the outer wall of the primary milk-receiver C is preferably made of flexible rubber with an inturned and serrated margin at top, as shown in Fig. 2. Beneath this inturned margin is a network $c^3$, of felt, wadding, or other material permeable to air, surrounded by a spiral spring $c^2$, of wire, to produce a massage surface for the udder under the intermittent pressure and suction or air-exhaust operation. An air-pipe $o$ communicates with the outer chamber $m$, and this communicates by a branch pipe $t$ in one direction with a cock $s$, opening directly into the vacuum-chamber B and in the other direction with the lower port $g^2$ of the cock $g$.

$r$ represents a cock communicating with the outer air, which is manipulated in the beginning of the operation to effect intermittent pressure or alternating pressure and suction.

The operation is as follows: At the beginning of the milking operation the upper duct $g'$ of the cock $g$ is connected with vacuum-receiver B. The small air-cock $r$, which is arranged in the line of the lower duct $g^2$ of cock $g$, is then opened. By suitably turning the cock $g$ intermittent suction is produced in the chamber $c'$ of the milk-receptacle and pressure in the chamber $m$. At the same time jets of warm milk are thrown against the teat and warm air is forced through the chamber $c$ by the pumping mechanism described. The alternating sucking and pressure are continued until it is noticed that the milk runs properly—i. e., in a strong stream. As soon as this is the case then turning of cock $g$ is no longer necessary, but the air-cock $r$ is closed, and then by opening the cocks a continuous vacuum is produced in the chamber $m$, so that the udder closes the two chambers $m$ and $c'$ to the outer air. The milk then runs continuously, and the duct $g'$ of cock $g$ carries the same into can B'.

What we claim as our invention, and desire to secure by Letters Patent, is—

1. In a milking apparatus the combination of a milk-receiving chamber adapted to inclose the teat, air-exhausting apparatus connected therewith, a lateral opening into the upper part of said chamber, an air-pipe connected with said lateral opening, means for injecting air into the chamber through said pipe and lateral opening and means for introducing a portion of the milk into said injecting-pipe, whereby a jet of milk is thrown against the teat during the milking operation, as explained.

2. In combination with a milk-receiving chamber adapted to inclose the teat, an air-exhausting apparatus connected therewith, means for injecting moist warm air into the upper part of said chamber and means for warming and purifying the air before injection, substantially as set forth.

3. The combination of the milk-receiving chamber $c'$ pipe D for conducting milk from the lower part thereof, air-pipe $p$ connecting with the upper part thereof, check-valves $d$ and $k$ to prevent the reflux of fluids in said pipes, means for injecting milk into the air-pipe $p$ and an air-forcing apparatus to inject such milk against the teat as explained.

4. The combination of the milk-receiving chamber $c'$ milk-pipe D conducting therefrom, a suitable exhausting appliance connected with said milk-conducting pipe, and an air-pipe passing through the milk-pipe D and connected with the chamber $c'$ whereby air delivered to the chamber $c'$ through the pipe $p$ is warmed by the flow of milk around said pipe as explained.

5. The combination of the milk vessel B milk-pipe D delivering therein, air-exhausting pipe $c$ connected with the vessel B through a valve-guarded opening, and a float L controlling said valve so as to prevent overflow of milk through the exhaust-pipe, as explained.

GEORG SIEMSGLÜSS.
GEORG DASEKING.

Witnesses:
KIRKE LATHROP
LEONORE KASCH.